May 9, 1933.   C. A. NICKLE   1,907,559

ELECTRICAL CONTROL AND REGULATING CIRCUITS

Filed Dec. 10, 1931

Inventor:
Clifford A. Nickle,
by *Charles W. Tullar*
    His Attorney.

Patented May 9, 1933

1,907,559

UNITED STATES PATENT OFFICE

CLIFFORD A. NICKLE, OF SCHENECTADY, NEW YORK, ASSIGNOR TO GENERAL ELECTRIC COMPANY, A CORPORATION OF NEW YORK

ELECTRICAL CONTROL AND REGULATING CIRCUITS

Application filed December 10, 1931. Serial No. 580,102.

My invention relates to electrical control and regulating circuits and more particularly to circuits which depend for their operation upon a non-linear volt-ampere characteristic impedance element.

Although my invention is not necessarily limited thereto, I prefer to employ a non-linear impedance element in the form of a resistance which changes its value instantaneously and inversely with changes in voltage applied thereto. One such element is a synthetic voltage dependent resistance material consisting of a fired mixture of carborundum, clay and carbon. Such a resistance material is described and claimed in Patent No. 1,822,742, granted Sept. 8, 1931, on an application of Karl B. McEachron, and assigned to the assignee of the present application.

I have embodied my invention in an automatic voltage regulator, which is adapted for use in connection with polyphase alternating current dynamo-electric machines and which has a number of interdependent features. One of these features consists in making use of a voltage dependent resistance element for controlling an electrical condition of one electric circuit in accordance with variations in an electrical condition of another electric circuit, and in an advanced form is used to control the circuit of a relay, or other suitable circuit controller, for controlling the excitation of a dynamo-electric machine in response to changes in voltage of this machine. Another feature of my invention makes use of a plurality of voltage dependent resistance elements for operating a control device, or relay, in response to an unbalance, or difference in, a plurality of voltages. Such an arrangement is useful in connection with polyphase alternating current regulating systems in that it can be made to increase the excitation of a regulated polyphase dynamo-electric machine in accordance with an unbalance in the phase voltages of this machine.

An object of my invention is to provide a simple, reliable and quick acting electrical control arrangement.

Another object of my invention is to provide a regulating arrangement for polyphase alternating current systems which makes use of an instantaneously acting voltage-dependent resistance element and which responds to unbalanced as well as to balanced variations in the regulated phase conditions of the system.

My invention will be better understood from the following description taken in connection with the accompanying drawing and its scope will be pointed out in the appended claims.

Figure 1:
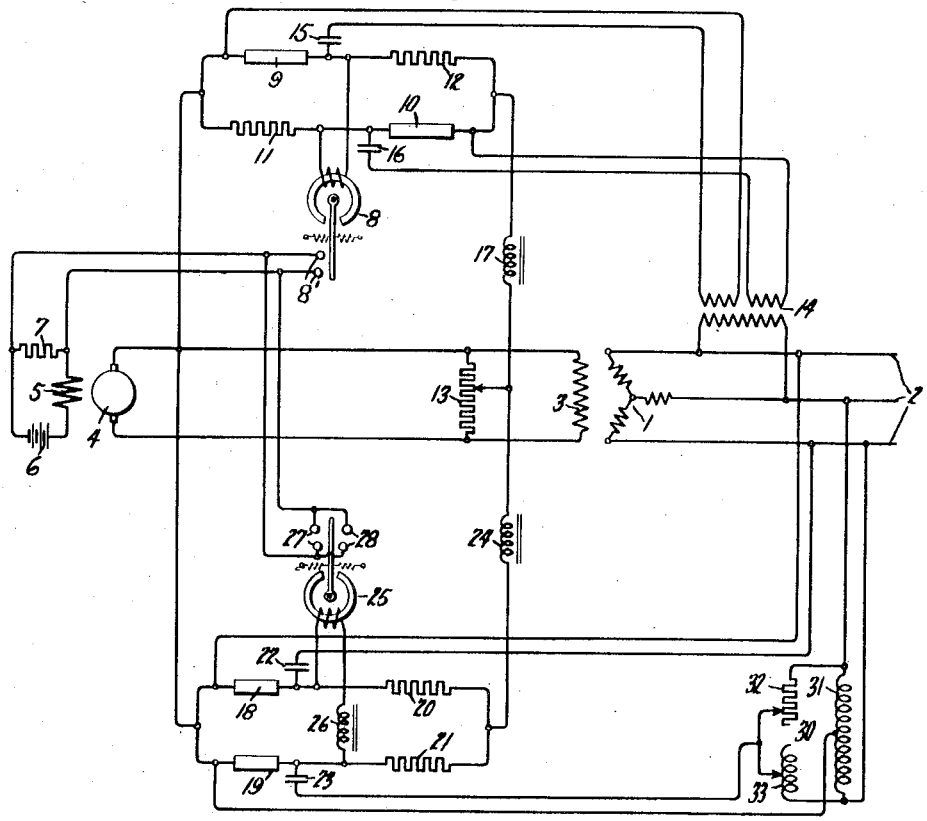
Figure 2:
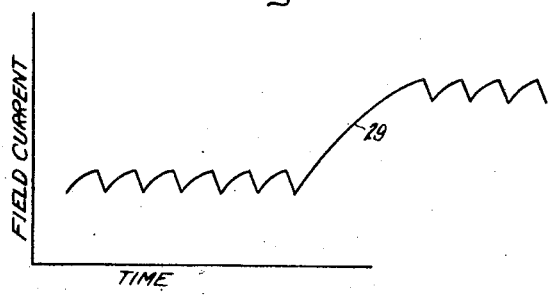

In the drawing, Fig. 1 illustrates diagrammatically the various features of my invention combined into a voltage regulator for a three phase alternating current generator, while Fig. 2 is a curve for illustrating the operation of my regulator.

Referring now to Fig. 1, wherein I have shown my regulating means applied to a three phase synchronous alternating current generator having an armature winding 1 connected to a three phase circuit 2 and a field winding 3 connected to be energized from any suitable source of current supply, such as from the armature 4 of a suitable exciter. The exciter has a field winding 5 which may be energized in any suitable way, and as shown is separately excited from a battery 6 which is connected to winding 5 through a current limiting resistor 7. A polarized relay 8 has contacts 8' which are arranged to short circuit resistor 7 and thereby control the excitation of the exciter. Relay 8 is controlled in response to the voltage of one of the phases of circuit 2 through a Wheatstone bridge arrangement of four impedance elements comprising a pair of voltage dependent resistance elements 9 and 10, and a pair of ordinary linear resistance elements 11 and 12. As shown, the operating coil of polarized relay 8 is connected between opposite points of the bridge while the remaining two opposite points of the bridge are energized from the exciter armature 4 through a suitable potentiometer arrangement 13, whereby the input voltage to the bridge circuit may be adjusted.

Resistances 9 and 10 are connected to have alternating current voltages proportional to the voltage of one of the phases of circuit 2 applied thereto by means of a suitable potential transformer 14. It is preferable, although not necessary, to connect condensers 15 and 16 in series with the variable voltage alternating current circuits which are connected to the voltage dependent resistances 9 and 10, so as to prevent saturation of transformer 14 by the direct current which also flows in these resistance elements. Similarly, it is preferable, although not necessary, to insert a reactor 17 in the direct current supply circuit to the bridge so as to prevent the flow of alternating current therein.

The above arrangement is so adjusted that when the voltage of the phase to which transformer 14 is connected is above normal, the bridge circuit will be unbalanced in such a direction as to cause polarized relay 8 to open its contacts while if the voltage is below normal the resistance of elements 9 and 10 will be so high that the bridge will cause a reversal in polarity of the operating coil of relay 8 thereby causing it to short circuit resistance 7, which increases the excitation of the exciter and consequently results in an increase in the voltages of the exciter and the main machine.

It will be seen that the above arrangement responds only to the voltage of one of the phases of circuit 2 and consequently if the voltage of one of the other phases should depart from normal, as through a single phase short circuit on one of these phases for example, the regulator would not respond in a manner to increase the voltage of the regulated synchronous machine, which consequently might lose synchronism with the rest of the system, as represented by circuit 2. In order to cause my regulating arrangement to increase the excitation of the three phase machine whenever the voltage of one of the two phases to which transformer 14 is not connected should decrease, I provide an unbalance relay arrangement consisting primarily of a Wheatstone bridge arrangement of four impedance or resistance elements having preferably two voltage dependent resistance elements and two linear resistance elements. This bridge arrangement differs from the bridge arrangement previously described for securing voltage regulation in that the two voltage dependent resistance elements 18 and 19 are electrically adjacent to each other instead of being electrically non-adjacent as in the first described bridge arrangement. Similarly, the two linear resistance elements 20 and 21 are also electrically adjacent instead of being electrically non-adjacent as in the other bridge arrangement. In this manner when the bridge is balanced similar variations in the resistance of resistances 18 and 19 will not cause an unbalance thereof, while dissimilar variations will immediately cause an unbalance of the bridge. As shown, resistances 18 and 19 are connected respectively to respond to the voltages of the two remaining phases of circuit 2. Suitable condensers 22 and 23 are provided to prevent the flow of direct current into the alternating current circuit. This bridge is energized from exciter armature 4 in the same manner as is the first bridge and a suitable reactor 24 is provided for preventing the flow of alternating current into the direct current side of the system.

A suitable voltage relay 25 is connected across opposite points of the bridge and it would ordinarily be preferable to insert a reactor 26 in series with the operating coil of this relay because of the fact that the two voltage dependent resistors 18 and 19 would be energized by voltages which are not in phase with each other and consequently there would be some tendency for an alternating current to flow in the operating coil of relay 25. Reactor 26, however, reduces this current to a negligible value. However, this tendency may be entirely eliminated by connecting one, or both, of the voltage dependent resistances 18 and 19 to its respective phase, of circuit 2, through a suitable voltage phase shifting circuit. One such circuit, which is described in detail, and claimed, in Patent 1,719,866, granted July 9, 1929 on an application of E. F. W. Alexanderson, and assigned to the same assignee as the present application, is illustrated at 30. This circuit comprises a winding 31 across whose terminals are connected, in series, a variable resistance 32 and a variable reactance 33. Voltage dependent resistance 19 is connected between an intermediate point in winding 31 and a point between resistance 32 and reactance 33. By varying the relative ohmic values of elements 32 and 33 the phase of the potential of resistance element 19 may be shifted substantially 180° with respect to the voltage of the part of circuit 2 to which the phase shifting circuit is connected and by a proper adjustment the voltage impressed on resistance element 19 may be brought into phase with the voltage impressed on resistance element 18. In this way there will be no net alternating voltage impressed on the relay 25.

Relay 25 is shown as a polarized relay having two sets of contacts 27 and 28 which are connected in parallel with each other and which are connected parallel with contacts 8' of relay 8. Relay 25 is so arranged that when the bridge to which it is connected is balanced, neither of its contacts 27 or 28 will be closed, but as soon as the bridge is unbalanced in either direction one or the other of its pairs of contacts will be bridged thereby to short circuit resistance 7.

Before describing the operation of the arrangement illustrated in Fig. 1 as a whole, I wish to point out that both of the bridge circuits include simple instantaneously acting static means for controlling a condition of one circuit in response to a condition of another circuit. Thus for example, consider the circuit from the upper end of exciter armature 4 through voltage-dependent resistance 9, the coil of relay 8, voltage-dependent resistance 10, reactor 17 and through potentiometer 13 to the other side of the exciter armature. If now the voltage applied to resistance 9 is changed as by a change in voltage of circuit 2, which is transmitted through transformer 14, the resistance 9 will instantaneously change in value thereby changing the current in the direct current circuit which has just been traced. As shown, such an arrangement is particularly well adapted to controlling current in a direct current circuit in response to the voltage in an alternating current circuit.

The operation of the arrangement illustrated in Fig. 1 is as follows: Assume that the three phase alternating current generator and the exciter are both being operated from suitable sources of power in a normal manner and that the voltage of circuit 2 is slightly below normal on all three phases. Due to the fact that the alternating current voltage across resistances 9 and 10 is below normal these resistances will have a higher value than normal and consequently this bridge will be so unbalanced as to cause polarized relay 8 to bridge contacts 8'. This has the effect of increasing the excitation and consequently the voltage of exciter 4, thereby to increase the voltage of the main machine. As soon as the voltage exceeds normal, the bridge will be unbalanced in the opposite direction due to the fact that the high alternating current voltage applied to resistances 9 and 10 will so decrease their resistance as to reverse the balance of the bridge. This will cause a reversal in polarity of the polarized relay 8. Consequently it will open its contacts thereby decreasing the excitation of exciter 4 and consequently its voltage. This action is illustrated by the first part of Fig. 2 which shows how the field current of the exciter builds up at a relatively slow rate in comparison with its rate of build down, due to the fact that while the field current is building down the resistance 7 is inserted in its circuit with the result that the time constants of the circuit of winding 5 is changed alternately with the operation of the contacts 8'. This action is similar to the action of the ordinary vibratory contact type of voltage regulator and due to the relatively high inductance of the field winding 3 these periodic changes in exciter current will not result in appreciable periodic changes in the voltage of the main machine. It will thus be seen that the contacts 8' will vibrate rapidly thereby to hold a substantially constant terminal voltage on the main machine.

If now there should be a comparatively large decrease in voltage as by a sudden application of load to the main machine, the contacts 8' will be bridged by relay 8 and they will stay bridged until the voltage again slightly exceeds its normal value. As soon as the voltage of the main machine exceeds slightly its normal value, contacts 8' will open and the regulator will continue its vibratory action thereby to hold substantially constant voltage. This action whereby the regulator contacts remain closed until the voltage returns to substantially its normal value after a sudden relatively large decrease in voltage, is shown by part 29 of the curve in Fig. 2. The action of the regulator is thus relatively quick in comparison with an ordinary vibratory contact Tirrill type regulator in which the part 29 of the curve in Fig. 2 will be approximated by a jagged stepped line which would not represent as rapid a rise in exciter current as does the part 29 in Fig. 2.

The above described operation is only responsive to the voltage of one of the phases of circuit 2. As it is possible that a heavy load might be thrown on the polyphase regulated machine by a single phase short circuit on one of the other phases, it is desirable to provide means associated with the regulator for causing an increase in excitation when such relatively heavy single phase loads are applied. Thus for example, if the voltage of one of the other two phases should fall, the values of resistances 18 and 19 would be unequal and consequently the bridge circuit including these resistances would become unbalanced and polarized relay 25 would be energized to bridge either contacts 27 or 28 thereby to short circuit resistance 7 and increase the excitation of the main machine.

It will thus be seen that I have provided an automatic regulator which acts to hold substantially constant an electrical condition of a regulated machine or circuit, in this case voltage, and that it is responsive to a decrease in voltage on any one of the phases of this machine or circuit to automatically and rapidly cause an increase in excitation of the regulated machine.

While I have shown and described a particular embodiment of my invention, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States, is,—

1. In combination, a variable voltage alternating current circuit, a polarized direct current relay, means for controlling said relay in accordance with the voltage of said alternating current circuit comprising four resistance elements connected as a Wheatstone bridge, one of said elements being a non-linear volt-ampere characteristic element, a source of direct current connected to electrically opposite points of said bridge, said polarized relay being connected to the other electrically opposite points of said bridge, and means connecting said non-linear volt-ampere characteristic element to be responsive to the voltage of said alternating current circuit.

2. In combination, a pair of alternating current circuits, an electrical translating device, means for connecting said translating device to respond to a change in the relative voltage of said circuits comprising a Wheatstone bridge including a pair of electrically adjacent voltage dependent resistances, a source of current supply connected to electrically opposite points of said bridge, said translating device being connected between the two remaining electrically opposite points of said bridge, and means connecting said voltage dependent resistances to be responsive respectively to the voltage of said alternating current circuits.

3. In combination, a dynamo-electric machine, an excitation controlling circuit for said machine, a polarized relay for controlling said circuit, a Wheatstone bridge including a pair of instantaneously acting voltage dependent resistances, said relay being connected between electrically opposite points of said bridge, a source of direct current connected to the remaining two electrically opposite points of said bridge, and means connecting said voltage dependent resistances to be responsive to the voltage of said dynamo-electric machine.

4. In combination, a polyphase dynamo electric machine, means for changing the excitation of said machine whenever the relative valve of electrical conditions of a plurality of the phases of said machine change comprising an excitation controlling circuit, an electro-responsive device for controlling said circuit, a Wheatstone bridge comprising a plurality of resistances, two electrically adjacent ones of which are of the type which change their electrical resistance instantaneously and inversely with changes in applied voltage, said electro-responsive device being connected between electrically opposite points in said bridge, a source of current supply connected between the remaining two electrically opposite points of said bridge, and means connecting the voltage variant resistances of said bridge to respond respectively to an electrical condition of different phases of said machine.

5. In combination, a three phase synchronous dynamo-electric machine, means responsive to the voltage of one of the phases of said machine for regulating its voltage by controlling its excitation, and means responsive to any difference between the voltages of the other two phases of said machine for increasing its excitation.

6. In combination, an electric bridge circuit, two of the electrically adjacent arms of said bridge circuit including non-linear volt-ampere characteristic elements, means for producing a pair of out-of-phase alternating potentials, and means including potential phase shifting apparatus for connecting each of said elements to respond to the magnitude of a different one of said potentials, said phase shifting apparatus acting to cause the potentials which are applied to said elements to be in phase with each other.

7. In combination, a polyphase electric circuit, an electric bridge circuit, two of the electrically adjacent arms of said bridge circuit being instantaneously acting voltage dependent resistance elements, a source of direct current connected to two diagonal terminals of said bridge circuit, a translating device connected to the other two diagonal terminals of said bridge circuit, means connecting said voltage dependent resistance elements across different phases of said polyphase circuit respectively, said means including a voltage phase shifting device for causing the voltage of said polyphase circuits which are applied to said resistance elements to be in phase with each other.

In witness whereof, I have hereunto set my hand.

CLIFFORD A. NICKLE.